United States Patent
Chanda et al.

(10) Patent No.: US 10,411,912 B2
(45) Date of Patent: *Sep. 10, 2019

(54) MANAGING TUNNEL ENDPOINTS FOR FACILITATING CREATION OF LOGICAL NETWORKS

(71) Applicant: Nicira, Inc., Palo Alto, CA (US)

(72) Inventors: Anupam Chanda, San Jose, CA (US); Ariel Tubaltsev, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/934,987

(22) Filed: Mar. 24, 2018

(65) Prior Publication Data

US 2018/0219699 A1     Aug. 2, 2018

Related U.S. Application Data

(63) Continuation of application No. 15/130,853, filed on Apr. 15, 2016, now Pat. No. 9,942,058.

(Continued)

(51) Int. Cl.
*H04L 12/26* (2006.01)
*H04L 12/46* (2006.01)
(Continued)

(52) U.S. Cl.
CPC ...... *H04L 12/4633* (2013.01); *H04L 41/0803* (2013.01); *H04L 41/0816* (2013.01); *H04L 41/0893* (2013.01); *H04L 45/021* (2013.01)

(58) Field of Classification Search
None
See application file for complete search history.

(56) References Cited

U.S. PATENT DOCUMENTS 5,526,484 A    6/1996 Casper et al.
5,751,967 A    5/1998 Raab et al.
(Continued)

FOREIGN PATENT DOCUMENTS

EP    1154601 A1    11/2001
EP    1653688 A1    5/2006
(Continued)

OTHER PUBLICATIONS

Graubner, Pablo, et al., "Cloud Computing: Energy-Efficient Virtual Machine Consolidation," IT Professional, Mar. 2013, 7 pages, vol. 15, Issue 2, IEEE.
(Continued)

*Primary Examiner* — Anh Vu H Ly
(74) *Attorney, Agent, or Firm* — Adeli LLP

(57) ABSTRACT

Some embodiments provide a novel method for managing hardware forwarding elements (MHFEs) that facilitate the creation of multiple logical networks on a set of shared physical forwarding elements. The method uses a set of logical controllers that generate data that defines a set of logical networks, and a set physical controllers to distribute the generated data to the hardware forwarding elements. In some embodiments, each MHFE can serve as either a master WIFE or a slave MHFE for one set of computing end nodes (e.g., VMs, containers, etc.) in a logical network. To ensure proper routing of data packets to the computing end nodes, each MHFE sends to its physical controller an inventory (e.g., a table, a list, etc.) of the set of computing end nodes for which it serves as the master MHFE or the slave MHFE. Each physical controller forwards the inventory for each logical network to the logical controller for the logical network. Each logical controller maintains the master inventory of the MHFEs that are masters (and slaves if applicable) of the various compute end nodes of each logical network managed by the logical controller. After receiving a new inventory from a physical controller, the logical controller updates its records, resolves any conflicts while it is updating its records, and distributes one or more master/slave inventories for one or more logical networks that it manages to the physical controllers, which, in turn, pass this information to the MHFEs that they manage.

20 Claims, 7 Drawing Sheets

Related U.S. Application Data

(60) Provisional application No. 62/149,247, filed on Apr. 17, 2015.

(51) Int. Cl.
*H04L 12/24* (2006.01)
*H04L 12/755* (2013.01)

(56) References Cited

U.S. PATENT DOCUMENTS

| | | |
|---|---|---|
| 6,243,394 B1 | 6/2001 | Deng |
| 6,640,251 B1 | 10/2003 | Wiget et al. |
| 6,850,529 B1 | 2/2005 | Wong et al. |
| 7,463,639 B1 | 12/2008 | Rekhter |
| 7,933,198 B1 | 4/2011 | Pan |
| 7,937,438 B1 | 5/2011 | Miller et al. |
| 8,046,456 B1 | 10/2011 | Miller et al. |
| 8,161,095 B2 | 4/2012 | Manion et al. |
| 8,345,688 B2 | 1/2013 | Zhou et al. |
| 8,386,642 B2 | 2/2013 | Elzur |
| 8,589,919 B2 | 11/2013 | Smith et al. |
| 8,874,876 B2 | 10/2014 | Bhadra et al. |
| 8,897,134 B2 | 11/2014 | Kern et al. |
| 8,943,490 B1 | 1/2015 | Jain et al. |
| 8,964,528 B2 | 2/2015 | Casado et al. |
| 9,014,181 B2 | 4/2015 | Lakshman et al. |
| 9,032,095 B1 | 5/2015 | Traina et al. |
| 9,100,285 B1 | 8/2015 | Choudhury et al. |
| 9,130,870 B1 | 9/2015 | Swierk et al. |
| 9,154,433 B2 | 10/2015 | Koponen et al. |
| 9,306,843 B2 | 4/2016 | Koponen et al. |
| 9,319,375 B2 | 4/2016 | Gross, IV et al. |
| 9,331,940 B2 | 5/2016 | Balus et al. |
| 9,369,426 B2 | 6/2016 | Koponen et al. |
| 9,397,946 B1 | 7/2016 | Yadav |
| 9,455,901 B2 | 9/2016 | Davie et al. |
| 9,485,149 B1 | 11/2016 | Traina et al. |
| 9,577,927 B2 | 2/2017 | Hira et al. |
| 9,621,461 B2 | 4/2017 | Sun |
| 9,633,040 B2 | 4/2017 | Lee |
| 9,667,541 B2 | 5/2017 | Song |
| 9,699,070 B2 | 7/2017 | Davie et al. |
| 9,755,965 B1 | 9/2017 | Yadav et al. |
| 9,819,581 B2 | 11/2017 | Chanda et al. |
| 9,847,938 B2 | 12/2017 | Chanda et al. |
| 9,917,799 B2 | 3/2018 | Chanda |
| 9,923,815 B2 | 3/2018 | Assarpour et al. |
| 9,942,058 B2 | 4/2018 | Chanda et al. |
| 9,948,577 B2 | 4/2018 | Chanda |
| 9,967,182 B2 | 5/2018 | Chanda et al. |
| 9,979,593 B2 | 5/2018 | Chanda et al. |
| 9,992,112 B2 | 6/2018 | Chanda |
| 9,998,324 B2 | 6/2018 | Chanda et al. |
| 9,998,375 B2 | 6/2018 | Chanda |
| 10,153,965 B2 | 12/2018 | Davie et al. |
| 10,182,035 B2 | 1/2019 | Basler |
| 2002/0065919 A1 | 5/2002 | Taylor et al. |
| 2002/0093952 A1 | 7/2002 | Gonda |
| 2003/0041170 A1 | 2/2003 | Suzuki |
| 2003/0163645 A1 | 8/2003 | Tremblay et al. |
| 2004/0267866 A1 | 12/2004 | Carollo et al. |
| 2005/0262132 A1 | 11/2005 | Morita et al. |
| 2006/0092940 A1 | 5/2006 | Ansari et al. |
| 2007/0028039 A1 | 2/2007 | Gupta et al. |
| 2008/0189769 A1 | 8/2008 | Casado et al. |
| 2008/0215586 A1 | 9/2008 | Pruet |
| 2009/0006603 A1 | 6/2009 | Duponchel et al. |
| 2009/0150527 A1 | 6/2009 | Tripathi et al. |
| 2009/0161547 A1 | 6/2009 | Riddle et al. |
| 2011/0026521 A1 | 2/2011 | Gamage et al. |
| 2011/0075674 A1 | 3/2011 | Li et al. |
| 2011/0090911 A1 | 4/2011 | Hao et al. |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0147898 A1 | 6/2012 | Koponen et al. |
| 2012/0236761 A1 | 9/2012 | Yang et al. |
| 2012/0278802 A1 | 11/2012 | Nilakantan et al. |
| 2012/0290694 A9 | 11/2012 | Marl et al. |
| 2012/0303835 A1 | 11/2012 | Kempf et al. |
| 2013/0044636 A1 | 2/2013 | Koponen et al. |
| 2013/0058229 A1 | 3/2013 | Casado et al. |
| 2013/0058350 A1 | 3/2013 | Fulton |
| 2013/0058351 A1 | 3/2013 | Casado et al. |
| 2013/0060929 A1* | 3/2013 | Koponen ............ H04L 12/4633 709/224 |
| 2013/0103818 A1 | 4/2013 | Koponen et al. |
| 2013/0114466 A1 | 5/2013 | Koponen et al. |
| 2013/0121209 A1 | 5/2013 | Padmanabhan et al. |
| 2013/0132533 A1 | 5/2013 | Padmanabhan et al. |
| 2013/0223454 A1 | 8/2013 | Dunbar et al. |
| 2013/0287026 A1 | 10/2013 | Davie |
| 2013/0315246 A1 | 11/2013 | Zhang et al. |
| 2013/0322453 A1 | 12/2013 | Allan |
| 2013/0329548 A1 | 12/2013 | Nakil et al. |
| 2013/0336134 A1* | 12/2013 | Bao ................. H04L 41/046 370/252 |
| 2014/0029451 A1 | 1/2014 | Nguyen |
| 2014/0029618 A1 | 1/2014 | Janardhanan |
| 2014/0071986 A1 | 3/2014 | Isobe |
| 2014/0101467 A1 | 4/2014 | Jubran et al. |
| 2014/0195666 A1 | 7/2014 | Dumitriu et al. |
| 2014/0201738 A1 | 7/2014 | Choi et al. |
| 2014/0229605 A1 | 8/2014 | Besser |
| 2014/0269683 A1 | 9/2014 | Bhagavathiperumal et al. |
| 2014/0269709 A1 | 9/2014 | Benny et al. |
| 2014/0301391 A1 | 10/2014 | Krishnan et al. |
| 2015/0009992 A1 | 1/2015 | Zhang |
| 2015/0100560 A1 | 4/2015 | Davie et al. |
| 2015/0100675 A1 | 4/2015 | Davie et al. |
| 2015/0100704 A1 | 4/2015 | Davie et al. |
| 2015/0124586 A1 | 5/2015 | Pani |
| 2015/0124809 A1 | 5/2015 | Edsall et al. |
| 2015/0124821 A1 | 5/2015 | Chu et al. |
| 2015/0195178 A1 | 7/2015 | Bhattacharya et al. |
| 2015/0215189 A1 | 7/2015 | Lim |
| 2015/0281075 A1 | 10/2015 | Park et al. |
| 2015/0326425 A1 | 11/2015 | Natarajan et al. |
| 2015/0372906 A1 | 12/2015 | Tirat |
| 2015/0379150 A1 | 12/2015 | Duda |
| 2016/0014039 A1* | 1/2016 | Reddy ............... H04L 67/38 709/224 |
| 2016/0014073 A1 | 1/2016 | Reddy et al. |
| 2016/0173535 A1 | 6/2016 | Barabash et al. |
| 2016/0197824 A1 | 7/2016 | Lin et al. |
| 2016/0212222 A1 | 7/2016 | Bultema et al. |
| 2016/0232019 A1 | 8/2016 | Shah et al. |
| 2016/0308690 A1 | 10/2016 | Chanda et al. |
| 2016/0352633 A1 | 12/2016 | Kapadia et al. |
| 2016/0380812 A1 | 12/2016 | Chanda et al. |
| 2017/0034002 A1 | 2/2017 | Sinn |
| 2017/0034051 A1 | 2/2017 | Chanda et al. |
| 2017/0034052 A1 | 2/2017 | Chanda et al. |
| 2017/0034053 A1 | 2/2017 | Chanda et al. |
| 2017/0063608 A1 | 3/2017 | Wang et al. |
| 2017/0085502 A1 | 3/2017 | Biruduraju |
| 2017/0093617 A1 | 3/2017 | Chanda et al. |
| 2017/0093618 A1 | 3/2017 | Chanda et al. |
| 2017/0093636 A1 | 3/2017 | Chanda et al. |
| 2017/0093646 A1 | 3/2017 | Chanda et al. |
| 2017/0093686 A1 | 3/2017 | Uttaro et al. |
| 2017/0093758 A1 | 3/2017 | Chanda |
| 2017/0126615 A1 | 5/2017 | Chanda et al. |
| 2017/0171055 A1 | 6/2017 | Wang et al. |
| 2017/0171077 A1 | 6/2017 | Chanda |
| 2017/0171078 A1 | 6/2017 | Chanda |
| 2017/0171113 A1 | 6/2017 | Chanda |
| 2017/0208097 A1 | 7/2017 | Kirby et al. |
| 2017/0272316 A1* | 9/2017 | Johnson ............... H04L 61/301 370/252 |
| 2017/0317928 A1 | 11/2017 | Gude et al. |
| 2017/0366446 A1 | 12/2017 | Davie et al. |

(56) References Cited

U.S. PATENT DOCUMENTS

| | | |
|---|---|---|
| 2018/0007004 A1 | 1/2018 | Basler |
| 2018/0007005 A1 | 1/2018 | Chanda et al. |
| 2018/0026895 A1 | 1/2018 | Wang et al. |
| 2018/0183730 A1 | 6/2018 | Chanda |
| 2018/0241622 A1 | 8/2018 | Chanda et al. |
| 2018/0241672 A1 | 8/2018 | Chanda et al. |
| 2018/0248796 A1 | 8/2018 | Chanda et al. |

FOREIGN PATENT DOCUMENTS

| | | |
|---|---|---|
| JP | 2003069609 A | 3/2003 |
| WO | 2005112390 A1 | 11/2005 |
| WO | 2008095010 A1 | 8/2008 |

OTHER PUBLICATIONS

Pfaff, Ben, et al., "The Open vSwitch Database Management Protocol," draft-pfaff-ovsdb-proto-00, Aug. 20, 2012, 34 pages, available at http:tools.ietf.orghtmldraft-pfaff-ovsdb-proto-00.

* cited by examiner

MANAGING TUNNEL ENDPOINTS FOR FACILITATING CREATION OF LOGICAL NETWORKS

CLAIM OF BENEFIT TO PRIOR APPLICATIONS

This application is a continuation application of U.S. patent application Ser. No. 15/130,853, filed Apr. 15, 2016, and now published as U.S. Patent Publication 2016/0308690. U.S. Patent Publication 2016/0308690 claims the benefit of U.S. Provisional Patent Application 62/149,247, filed Apr. 17, 2015. U.S. Patent Publication 2016/0308690 is incorporated herein by reference.

BACKGROUND

Several solutions have been proposed to date to allow controllers to manage standalone network hardware devices. For instance, VMware's NSX for Multi-Hypervisor controllers manage hardware VTEP (virtual tunnel end point) devices through the OVSDB protocol. The hardware_vtep OVSDB schema that NSX uses to integrate with the VTEP devices is described at the openvswitch website. This schema uses the table Ucast_Macs_Remote to provide the MAC addresses of end-points in various logical switches, and their corresponding locators (VTEP IPs where the devices terminate VXLAN tunnels).

Two hardware VTEP devices can be two routers operating in Virtual Router Redundancy Protocol (VRRP) configuration. These two routers can be like an L3 switch or a switch-router, which has both switch and routing capabilities. During normal operations, only one VTEP device (i.e., VTEP1 or VTEP2) would be the active VTEP device for the VRRP solution: one of them would report the MAC address of the VRRP router through Ucast_Macs_Local. The NSX controller would propagate this MAC address and the VTEP IP (of the active VTEP device, VTEP1 or VTEP2) to all other VTEP devices connected to the logical switch that has the given VRRP router. The NSX controller would propagate this information through the Ucast_Macs_Remote table.

During failover or other error conditions, both VTEP devices (i.e., VTEP1 and VTEP2) may report the MAC address of the router. In that case, the NSX controller needs to decide which VTEP device is the active one, in order to update the Ucast_Macs_Remote table of all other VTEP devices correctly. Therefore, there is a need for a method for the controller to support such VRRP solutions.

BRIEF SUMMARY

Some embodiments provide a novel method for managing hardware forwarding elements that facilitate the creation of multiple logical networks on a set of shared physical forwarding elements. The method uses a set of logical controllers that generate data that defines a set of logical networks. The number of logical controllers can be different than the number of logical networks as one logical controller typically can generate data for multiple logical networks. The method also uses a set physical controllers to distribute the generated data to the hardware forwarding elements. The number of physical controllers does not have to equal the number of hardware forwarding elements as one physical controller typically distributes data to multiple hardware forwarding elements. Also, in some embodiments, one controller can operate as both a logical controller and a physical controller. Alternatively, each controller in some embodiments is a separate software process, and one computing device can execute two controller processes, where one controller process is a logical controller and another controller process is a physical controller.

In some embodiments, each managed hardware forwarding element (MHFE) can serve as the master MHFE for one set of computing end nodes (e.g., VMs, containers, etc.) in a logical network. Also, in some embodiments, each MHFE can be master MHFE for multiple different sets of computing end nodes for multiple different logical networks. In some embodiments, each MHFE can also serve as a slave MHFE for one or more other sets of computing end nodes in one or more logical networks. To ensure proper routing of data packets to the computing end nodes, each MHFE sends to its physical controller an inventory (e.g., a table, a list, etc.) of the set of computing end nodes for which it serves as the master MHFE. In some of the embodiments that have MHFEs also designated as slave MHFEs, each MHFE's inventory also includes the set of computing end nodes for which the MHFE serves as the slave MHFE.

Each physical controller (1) divides the received inventory from each MHFE into different inventories for different logical networks, and then (2) forwards the inventory for each logical network to the logical controller for the logical network. For each logical controller, the inventory that the physical controller in some embodiments generates includes master MHFE data records (and slave MHFE data records if applicable) for one or more logical networks managed by the logical controller. In some embodiments, for a logical network, the physical controller batch processes multiple inventories that it receives from different MHFEs, before it sends one aggregated inventory to the logical controller of the logical network. Specifically, in some embodiments, the physical controller batch processes the inventories that it receives from the MHFEs so that the physical controller can just send one inventory to the logical network's logical controller on a periodic basis or after the inventory has reached a certain size. In other embodiments, the physical controllers process the received inventories in real time so that the logical controllers can receive inventories as soon as possible.

Each logical controller maintains the master inventory of the MHFEs that are masters (and slaves if applicable) of the various compute end nodes of each logical network managed by the logical controller. After receiving a new inventory from a physical controller, the logical controller examines the master MHFE data records (and slave MHFE data records if applicable) in the new inventory and in its master inventory to update its records in the master inventory. In its attempt to keep its master inventory up to date, the logical controller might identify cases where two MHFEs identify themselves as the master of a compute end node. In such circumstances, the logical controller uses a conflict resolution process to resolve the discrepancy in the reported data records, and based on the output of this process, designates one of the two MHFEs as the mater of the compute end node. To resolve conflict between two MHFEs specifying that they are masters of the same MAC, the logical controller in some embodiments picks the last WIFE that provided the MAC record, based on a reasoning that, in the case of failover the latest MHFE to report the MAC is the active one.

In some embodiments, more than two MHFEs might identify themselves as masters of a compute end node, and the conflict resolution process of the logical controller resolves this inconsistency to identify only one of the MHFEs as the master MHFE of the compute end node. Also, in some embodiments, no WIFE identifies itself as the master of a compute end node as each MHFEs associated with the compute end node, believes itself to be a slave MHFE. In such cases, the conflict resolution process of some embodiments analyzes the reported data and designates one of the MHFEs as the master MHFE for the compute end node.

After processing one or more inventories that it receives from one or more physical controllers, the logical controller distributes one or more master/slave inventories for one or more logical networks that it manages to the physical controllers. In some embodiment, each distributed master/slave inventory identifies for each MHFE, the compute end nodes for which the MHFE is the master MHFE and the compute end nodes for which the MHFE is the slave MHFE. In other embodiments, each distributed inventory only identifies updates to previous inventories that the logical controller previously distributed.

Also, in some embodiments, each physical controller only gets the inventory records for the MHFEs that the physical controller manages. After receiving an updated master/slave inventory form a logical controller, the physical controller parses the updated inventory into different inventories for its different physical controllers and then to each of its physical controllers that has one or more updated records, sends the updated records in an updated inventory. The MHFEs then use the updated records to update their respective records, and then use these updated records to process packets (e.g., route packets) to compute end nodes in the network.

One of ordinary skill will realize that the collection, reconciliation and distribution process of some embodiments can be used more generally to collect, reconcile and distribute MAC inventories for any arbitrary architecture that (1) has one or more MACs operate between logical network tunnel endpoints (e.g., hardware forwarding elements or software forwarding elements), and (2) has the MAC addresses behind different logical network tunnel endpoints distributed to the logical network tunnel endpoints. The MAC addresses are collected, reconciled and distributed so that the logical network tunnel endpoints will know how to route data packets that are intended for machines (or containers) behind other logical network tunnel endpoints.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for managing hardware forwarding elements that facilitate the creation of multiple logical networks on a set of shared physical forwarding elements. The method uses N logical controllers to generate data that define M logical networks (where N and M are integers that can be different), and O physical controllers for communicating with the managed hardware forwarding elements (MHFEs). Each logical controller acts as arbiter that specifies different MHFEs as the master MHFEs for different sets of computing end nodes (e.g., VMs, containers, etc.) in a logical network. At any given time, each logical controller in some embodiments serves as a master logical controller for one or more logical networks. While serving as a master logical controller for a logical network, the logical controller in some embodiments is the only logical controller that can generate data that can be used to define the logical network.

To specify the list of master MHFEs, each logical controller receives through the physical controllers, each MHFE's master records that identify the compute end nodes for which the MHFE is the master. After resolving any inconsistencies in these records, the logical controller provides to the physical controllers master records that identify the MHFEs that are masters of the compute end nodes of the logical network, so that each physical controller can then relay to its MHFE(s) the master records.

In some embodiments, each MHFE can also serve as a slave MHFE that acts a backup MHFE for a master MHFE that is primarily responsible for a set of compute end nodes in a logical network. When two MHFEs identify themselves as a master MHFE for a set of compute end nodes (e.g., during a failover condition when the failed and new MHFE are being reported as the master MHFE for the set of compute end nodes), the logical controller identifies one of them as the master MHFE and the other one as the slave MHFE. To specify the list of master and slave MHFEs, each logical controller (1) receives through the physical controllers, each MHFE's master and slave records that identify the compute end nodes for which the MHFE is the master and is the slave, and (2) after resolving any inconsistencies in these records, distributes to the MHFEs through the physical controllers, verified master and slave records that correctly identify the MHFE master and slaves for the different sets of compute end nodes.

Figure 1:
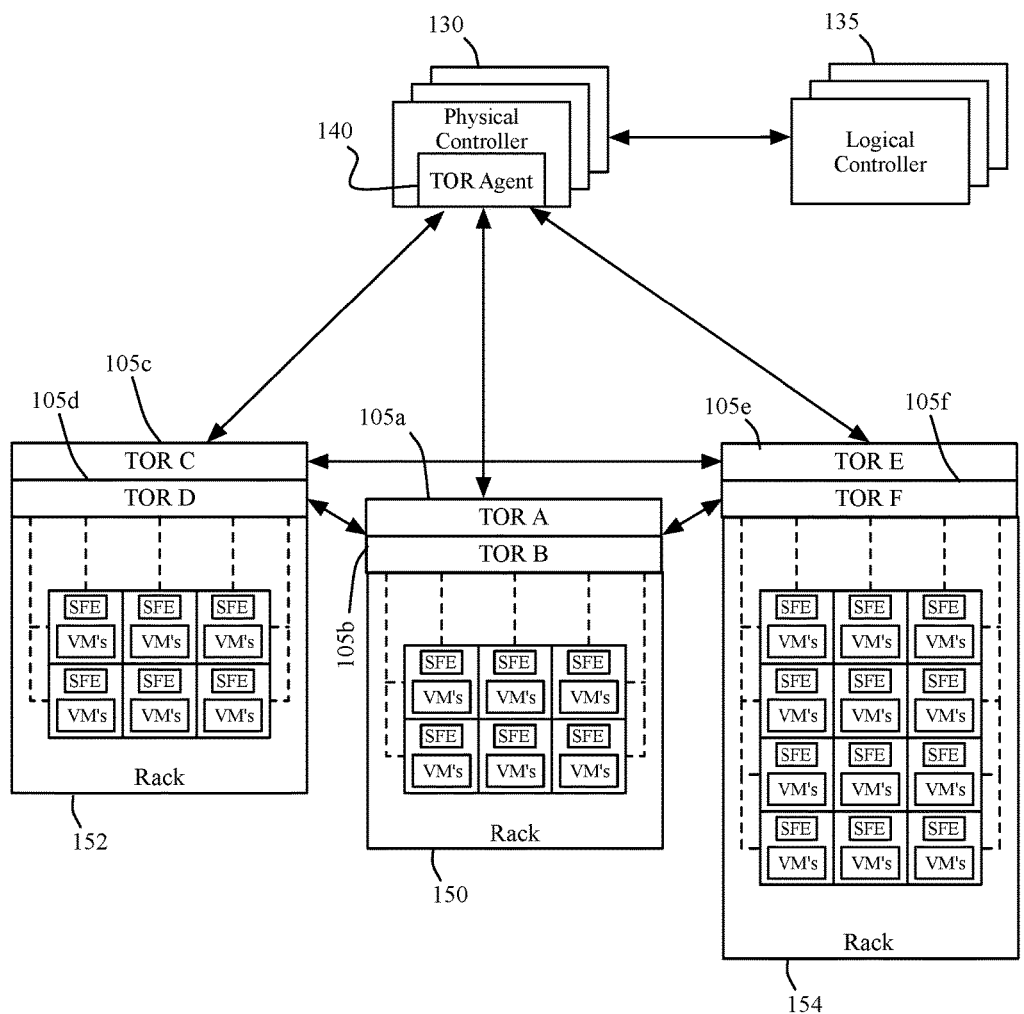
FIG. 1 illustrates a network control system that implements the hardware forwarding element management method of some embodiments of the invention.

FIG. 1 illustrates a network control system 100 that implements the MHFE management method of some embodiments of the invention. In this example, the MHFEs are top-of-rack (TOR) switches that connect software forwarding elements (SFE) executing on hosts in one rack to SFEs executing on hosts on other racks. In this figure, three racks 150, 152, and 154 are shown. As further shown, each rack includes two TORs 105 and several hosts 110, with each host executing one or more virtual machines 115 and at least one SFE 120 (e.g., a software switch and/or router). In this example, the method is used to manage the identity of master and slave TORs for each compute node in each rack.

In some embodiments, the SFEs 120 are configured to form multiple logical forwarding elements (e.g., logical switch). Each LFE is an abstract construct that conceptually spans multiple SFEs to connect VMs on multiple different hosts to each other. Several examples of LFEs will be further provided below. In some embodiments, overlay tunnel connections between the hosts facilitate the creation of the LFEs. To create overlay connections between hosts in different racks, some embodiments define tunnel connections between different pairs of TORs in different racks. For the example illustrated in FIG. 1, four tunnels are created between each TOR in each rack's pair of TORs and each TOR in another rack's pair of TORs. For instance, between racks 150 and 152, one tunnel is created between TORs 105a and 105c, one tunnel is created between TORs 105a and 105d, one tunnel is created between TORs 105b and 105c, and one tunnel is created between TORs 105b and 105d.

Different types of tunnels can be used in different embodiments. Examples of such tunnels include STT (stateless transport tunnels), GRE (Generic Routing Encapsualtion) tunnels, VXLAN tunnels, etc. Tunnels can often be viewed as point-to-point logical wire connections between their endpoints (e.g., between a pair of TORs) because tunnels can traverse through intervening network fabric (e.g., intervening switches, routers, etc.).

To manage the master and slave assignments of the MHFEs, the network control system 100 includes a set of physical controllers 130 and a set of logical controllers 135. The logical controllers generate data to define the logical forwarding elements, while the physical controllers distribute the generated data to the MHFEs and SFEs. The number of logical controllers can be different than the number of logical networks as one logical controller can generate data for multiple logical networks. The generated data is used to configure the SFEs and TORs to implement the logical forwarding elements.

In some embodiments, the generated data is transformed into physical data by the physical controllers 130, local controllers (not shown) executing on the hosts, and/or by modules operating on the TORs, before this data is supplied to SFEs and/or TORs. For instance, before distributing the data generated by the logical controller, a physical controller in some embodiments converts the data into another format, e.g., into (1) physical control plane data for the TORs and/or SFEs, or (2) into a format that a TOR module or host local controller can further process to produce physical control plane data.

The number of physical controllers can be different than the number of TORs as one physical controller typically distributes data to multiple TORs. Also, in some embodiments, only one physical controller is the master controller for supplying data to a set of TORs to configure the TORs to facilitate the creation of LFEs. At any given time, only the master physical controller can provide data to its TORs. In some embodiments, each TOR's master physical controller can have another physical controller that operates as a slave physical controller that serves as a backup (e.g., a hot standby backup) to the master physical controller in case the master controller fails.

In some embodiments, one controller can operate as both a logical controller and a physical controller. Each controller in some embodiments is a separate software process, and one computing device can execute two controller processes, where one controller process is a logical controller and another controller process is a physical controller. To communicate with its TORs, each physical controller has a TOR agent 140 to communicate with the TORs for which the physical controller is the master controller (i.e., the primary controller for communicating with the TORs). In some embodiments, the TORs and TOR agents communicate with each other by using the OVSdb communication protocol.

In some embodiments, each TOR can serve as the master TOR for one set of computing end nodes (e.g., VMs, containers, etc.) in a logical network and as the slave TOR for another set of computing end nodes in the logical network. An appliance or a set of appliances that executes a VRRP (virtual router redundancy protocol) designates the master and slave TORs in some embodiments. Such a VRRP appliance is provided by a number of hardware vendors. This appliance is not shown in FIG. 1, as the use of a VRRP appliance in not essential to the architecture illustrated in this and other figures; other schemes are used to assign master and slave TORs in other embodiments.

Also, each TOR can be master and/or slave TOR for multiple different sets of computing end nodes for multiple different logical networks. To ensure proper routing of data packets to the computing end nodes, each TOR sends to its master physical controller an inventory (e.g., a table, a list, etc.) of the set of computing end nodes for which the TOR serves as the master TOR and the set of computing end nodes for which it serves as the slave TOR. For each logical network, the physical controllers pass along the inventory data to the logical controller that manages the logical network, so that the logical controller can reconcile the various reported master/slave inventories and distribute to the TORs (through the physical controllers) a master inventory that identifies the correct master/slave TOR for each compute end node in a logical network. This reconciliation is useful avoid mis-routings that can occur when two TORs are reported as a master TOR for a VM (e.g., during a failover condition when the failed and new TOR are being reported as the master TOR for the VM).

In some embodiments, the controllers (e.g., the logical and physical controllers) communicate through RPC (remote procedure call) channels. Also, in some embodiments, the inventories that are exchanged between the TORs and the physical controllers, and between the physical and logical controllers, specifies the logical network or LFE associated with each compute end node (e.g., each MAC address) reported in the inventory. The logical network or LFE identify is useful in that it allows the parsing of the records in a received inventory into different inventories for different inventories for different logical or physical controllers or different TORs.

Figure 2:
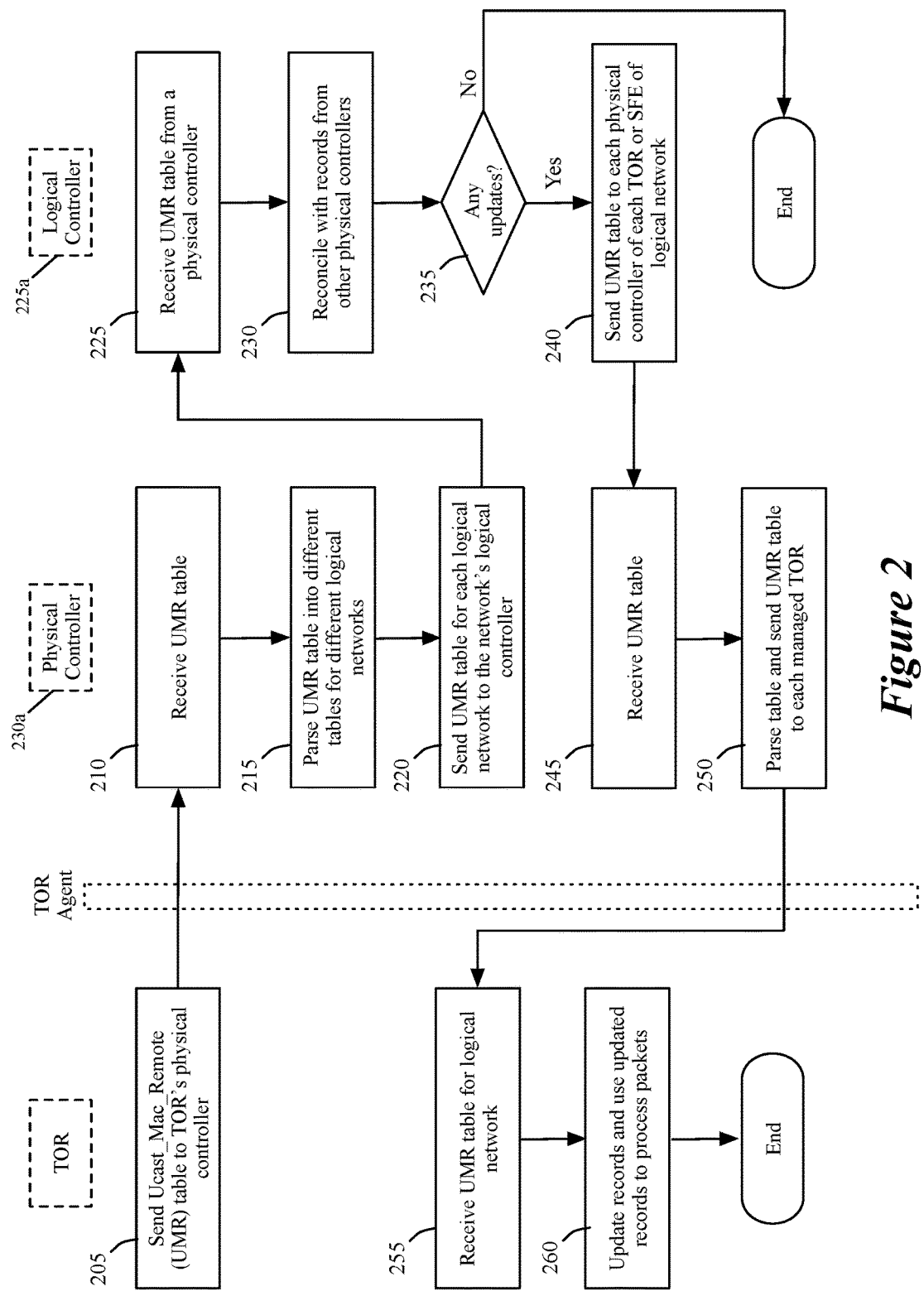
FIG. 2 illustrates a MHFE assignment process of some embodiment of the invention.

FIG. 2 illustrates a TOR assignment process 200 of some embodiment of the invention. In this process, each logical network's logical controller receives master/slave assignments from the TORs through the TOR physical controllers, and resolves any discrepancies in the reported assignments, before distributing a master assignment inventory to the TORs through the physical controllers. As shown, this process is implemented by different processes on each TOR, physical controller and logical controller associated with a logical network. The TORs and controllers can perform separate processes for each of the logical networks that they manage, or they can use one common set of processes to specify TOR assignments for several or all logical networks together. The TOR assignment process 200 will be explained by reference to FIGS. 3 and 4, which pictorially illustrate the reporting process for two examples for two LFEs 300 and 400 of two logical networks.

As shown, the process 200 starts (at 205) with a TOR sending a Ucast_Mac_Remote (UMR) table to the TOR's physical controller. This table specifies MAC addresses of the VMs in the TOR's rack for which the TOR is the master TOR or the slave TOR. In some embodiments, this table specifies all the MAC addresses of all the VMs in the TOR's rack for which the TOR is the master TOR or the slave TOR in one or more logical networks. In other embodiments, this table only specifies MAC records for one logical network. In still other embodiments, this table only provides MAC update records, such as MAC update records that the TOR modified recently for one logical network or all logical networks managed by the TOR.

The TOR assignment process 200 collects, reconciles, and distributes reconciled UMR tables in order to correctly identify the master TOR for each compute end node in racks 150, 152, and 154 so that the TORs can properly route data packets to the compute end nodes through the other TORs. In some embodiments, different TORs send their UMR tables to their physical controllers at different times, such as periodically at different offset times or in real time after changing a master or slave record.

Figure 3:
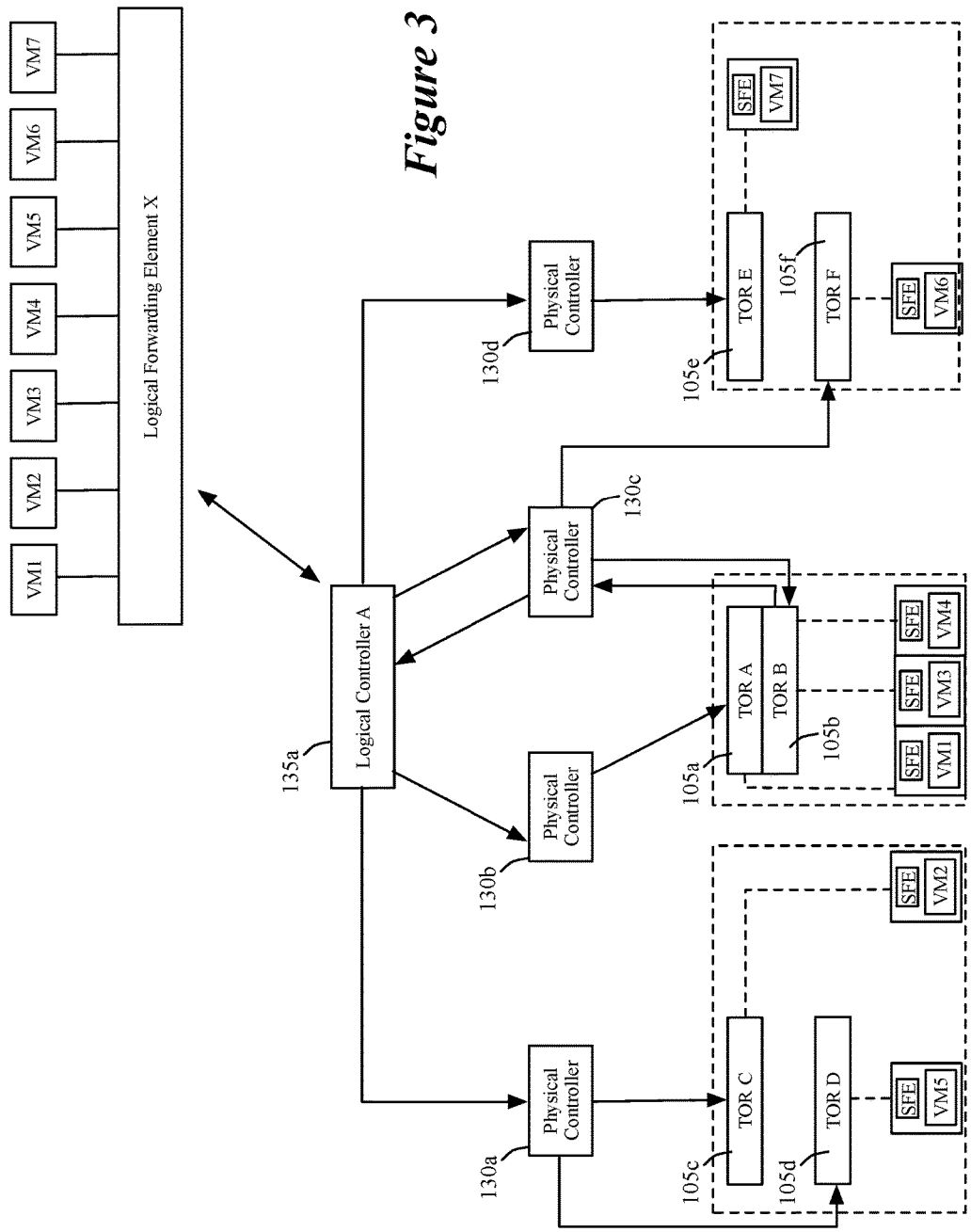
FIGS. 3 and 4 pictorially illustrate the reporting process for two examples for two LFEs of two logical networks.
Figure 4:
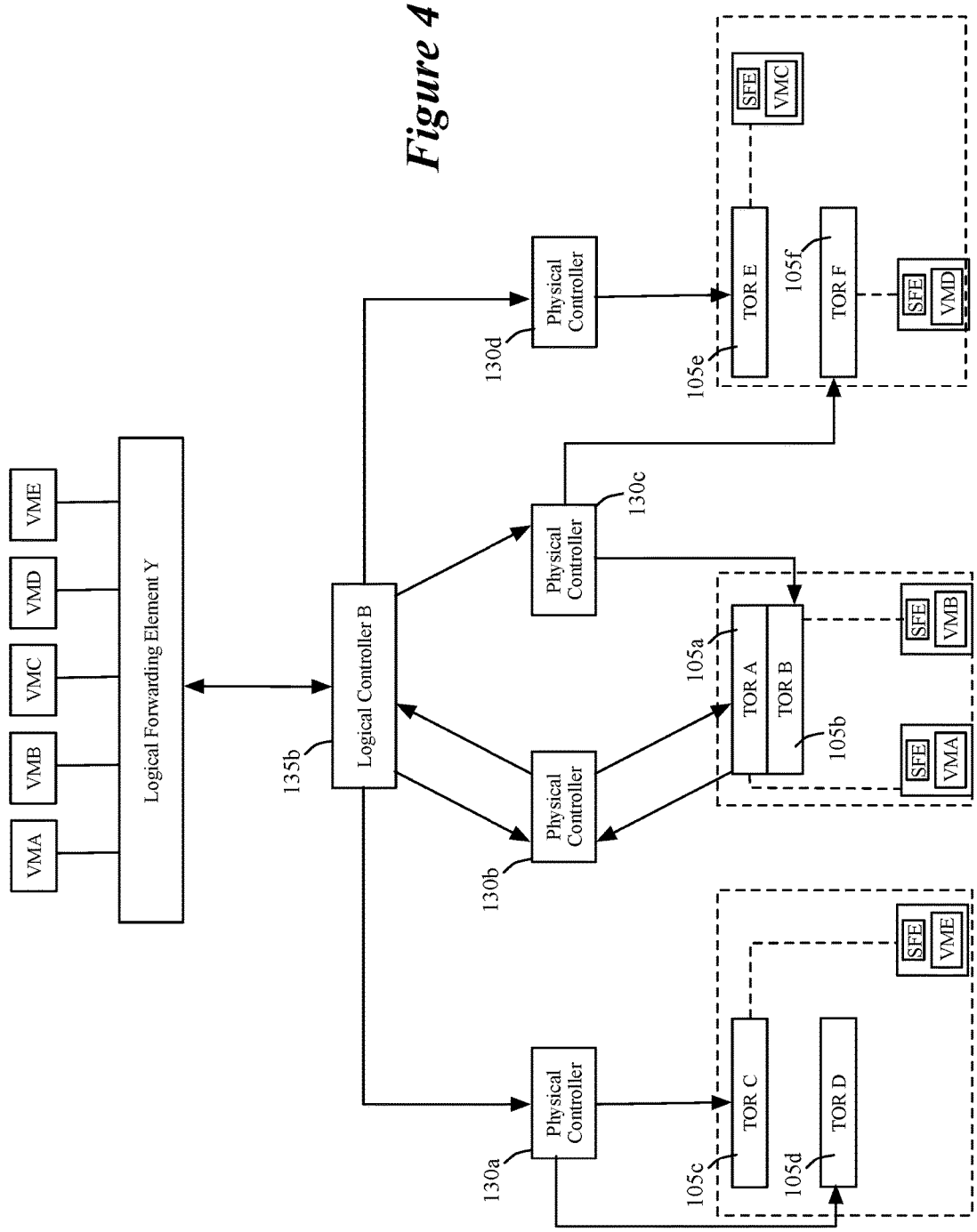

FIG. 3 illustrates an example of the TOR 105b sending a UMR table to its physical controller 130c, while FIG. 4 illustrates an example of the TOR 105a sending a UMR table to its physical controller 130b. In both of these examples, each TOR's UMR table only relates to the VM compute end nodes of one logical network. In FIG. 3, the UMR table relates to VMs associated with a logical forwarding element (e.g., logical switch or router) X, while in FIG. 4, the UMR table relates to VMs associated with a logical forwarding element Y. As shown, logical forwarding element X conceptually spans multiple hosts to connect VMs 1-7, while logical forwarding element Y conceptually spans multiple hosts to connect VMs A-E.

As mentioned above, the TORs in some embodiments send UMR tables that include master/slave records for multiple logical networks. Accordingly, after receiving a UMR table (at 210) that may contain records for more than one logical network, a physical controller divides (at 215) the received UMR table from each TOR into different UMR table for different logical networks. The physical controller forwards (at 220) the UMR table that it generates for each logical network to the logical controller for the logical network. FIG. 3 illustrates the physical controller 130c forwarding a UMR table for logical network X to the logical controller 135a after receiving a UMR table from the TOR 105b, while FIG. 4 illustrates the physical controller 130b forwarding a UMR table for logical network Y to the logical controller 135b after receiving a UMR table from the TOR 105a.

For each logical network, the UMR table that the physical controller in some embodiments generates includes master and slave TOR data records for one or more logical networks managed by the logical controller. In some embodiments, for a logical network, the physical controller waits to collect and process multiple UMR tables that it receives from multiple TORs, before it sends one aggregated UMR table to the logical controller of the logical network. More specifically, in some embodiments, a physical controller batch processes the UMR tables that it receives from the TORs so that the physical controller only sends one UMR table to a logical controller on periodic basis or after the UMR table has reached a certain size. In other embodiments, the physical controllers process the received UMR tables in real time so that the logical controllers can receive UMR tables as soon as possible.

Each logical controller maintains the master UMR table of the TORs that are masters and slaves of the VMs of each logical network managed by the logical controller. After receiving (at 225) a new UMR table from a physical controller, the logical controller examines (at 230) the master and slave TOR data records in the new UMR table and in its master UMR table to update its records in the master UMR table. In its attempt to keep its master UMR table up to date, the logical controller might identify cases where two TORs identify themselves as the master of one VM. In such circumstances, the logical controller uses (at 230) a conflict resolution process to resolve the discrepancy in the reported data records, and based on the output of this process, designates one of the two TORs as the mater of the compute end node.

To resolve conflict between two TORs specifying that they are masters of the same MAC, the logical controller in some embodiments picks the last TOR that provided the MAC record, based on a reasoning that, in the case of failover the latest TOR to report the MAC is the active one. For instance, in some embodiments, the logical controller processes RPC messages for a given logical forwarding element using a first-come-first-served (FCFS) mechanism (e.g., uses a first-in, first-out queue). In some embodiments, the logical controller assigns a time (based on its local clock) for each of these local MACs arriving from different virtual tunnel end point devices (e.g., different TORs). If there is a MAC conflict (two virtual tunnel end point devices reporting the same MAC), the logical controller picks the latest tunnel end point device that reports the MAC based on the time stamps.

In other embodiments, the logical controller resolves conflicts by using time stamps (e.g., by selecting the later time stamps) that each virtual tunnel end point device (e.g., TOR) records for each of its MAC records to indicate the time that the TOR made a determination that it was the master of the MAC. In still other embodiments, the physical controllers assign the timestamps when they receive the MAC records from the TORs. In this way, the timestamps are indicative of when the records reached the system as a while, not just when the records were received by the logical controller.

In some embodiments, more than two TORs might identify themselves as masters of a VM, and the conflict resolution process of the logical controller resolves this inconsistency to identify only one of the TORs as the master TOR of the compute end node. Also, in some embodiments, no TOR identifies itself as the master of a VM as each TORs associated with the VM, believes itself to be a slave TOR. In such cases, the conflict resolution process of some embodiments analyzes the reported data and designates one of the TORs as the master TOR for the VM. For a logical network, the logical controller waits to collects multiple UMR tables that it receives from multiple physical controllers, before it processes the UMR tables in batch (e.g., on a periodic basis or after the collected UMR tables have reached a certain size). In other embodiments, the logical controller processes each received UMR table in real time so that the TORs can receive reconciled UMR tables as soon as possible.

After processing the UMR table(s) that it receives from one or more physical controllers, the logical controller determines (at 235) whether it has modified any master/slave records, which would require the logical controller to distribute an updated UMR table. If not, the process ends. In such a situation, before terminating, the logical controller of some embodiments sends a message to the physical controller that sent it the UMR table to direct the physical controller to inform the TOR that provide the initial UMR table update that no UMR records need to be changed by the TOR.

When the logical controller determines (at 235) that it has updated one or more master/slave records, it distributes one or more UMR tables for one or more logical networks that it manages to the physical controllers. In some embodiment, each distributed master/slave UMR table identifies for each TOR, the VMs for which the TOR is the master TOR and the VMs for which the TOR is the slave TOR. In other embodiments, each distributed UMR table only identifies updates to previous UMR tables that the logical controller previously distributed. FIG. 3 illustrates the logical controller 135a forwarding updated UMR tables to physical controllers 130a-130d, while FIG. 4 illustrates the logical controller 135b forwarding updated UMR tables to physical controllers 130a-130d.

In some embodiments, the logical controller sends to each physical controller only UMR table records for the TORs that the physical controller manages. After receiving (at 245) an updated UMR table form a logical controller, the physical controller (at 250) (1) parses the updated inventory into different inventories for its different TORs and then (2) to each of its TORs that has one or more updated records, sends the updated records in an updated UMR table. FIGS. 3 and 4 illustrates the physical controller 130a-130d forwarding updated UMR tables to the TORs for which they are masters. As shown, physical controller 130a is master of TORs 105c and 105d, physical controller 130b is master of TOs 105a, physical controller 130c is master of TORs 105b and 105f, and physical controller 130d is master of TOR 105e. As further shown in FIG. 4, physical controller 130a provides a new UMR table to TOR 105d even though this TOR is not the master of any VMs, because TOR 105d is the slave TOR for VME. In the examples illustrated in FIGS. 3 and 4, each TOR is either the master or slave TOR of a VM in its rack, and the master TORs are illustrated as the TORs that are connected to the VM hosts with dashed lines. Although not illustrated, one TOR can be the master TOR of one or more VMs on a host, while another TOR can be the master TOR of one or more other VMs on the same host, in some embodiments.

After receiving (at 255) the updated UMR table, each TOR then (at 260) uses the updated records to update its respective records, and then uses these updated records to process packets (e.g., route packets) to VMs in the network. After 260, the process 200 ends.

In the examples illustrated in FIGS. 1-4, the TOR assignment tables (i.e., the UMR tables in these examples) are gathered and distributed to the TORs. In other embodiments, however, these tables are also gathered and distributed from other tunnel endpoints, such as SFEs that execute on hosts. In some embodiments, these tunnel endpoints are SFEs that establish tunnels with TORs for facilitating the creation of logical networks.

Figure 5:
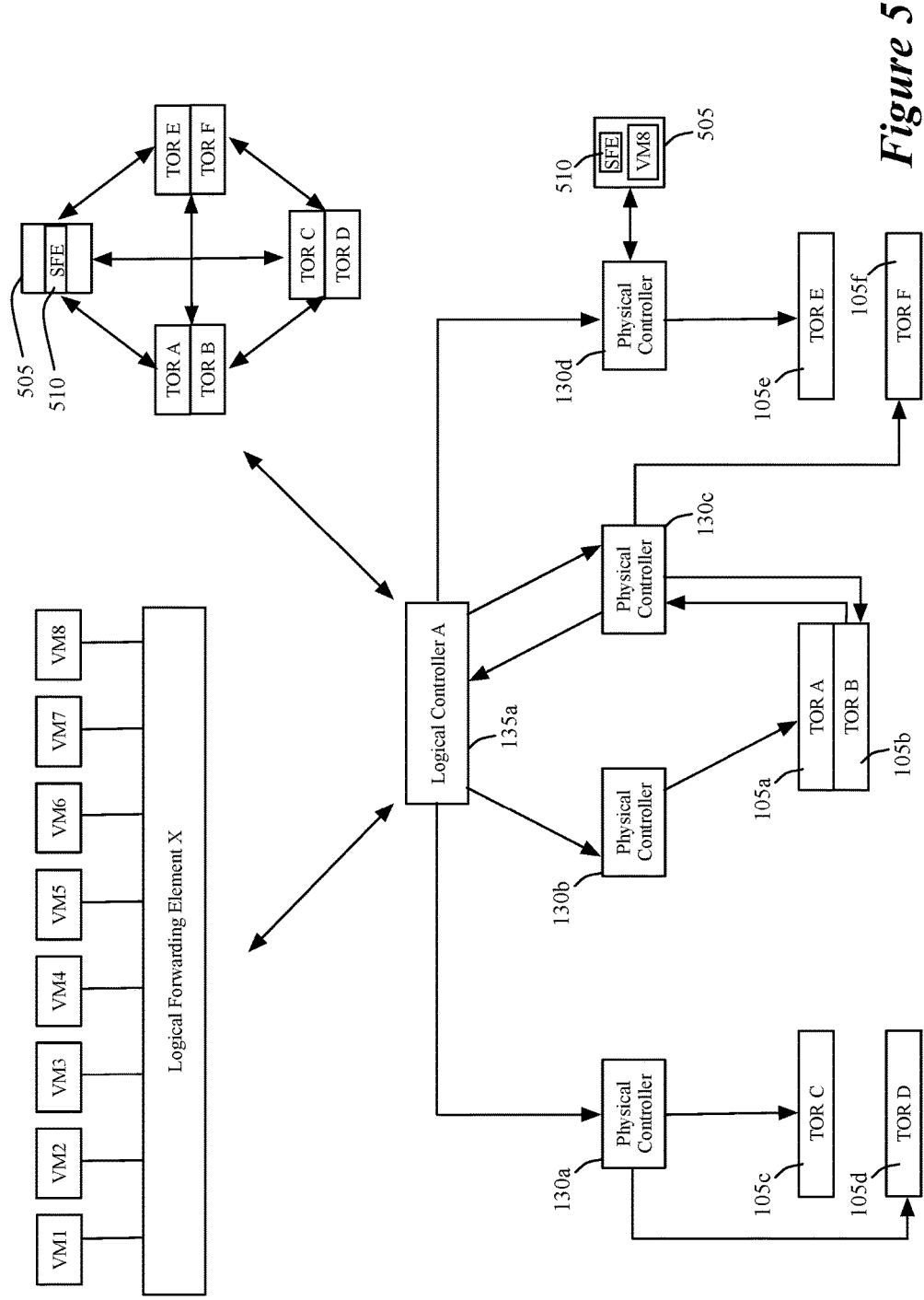
FIG. 5 illustrates an example of using some embodiments of the invention to distribute tunnel endpoint assignments to SFEs that serve as tunnel endpoints.

FIG. 5 illustrates an example of such a SFE. This example is identical to the example illustrated in FIG. 3, except that now the LFE X includes a VM8. This VM (VM8) executes on a host 505 that includes an SFE 510, which has established a tunnel to each of the six TORs A-F. As shown, each rack's TOR connects to the TORs in each other rack through a tunnel. Specifically, in FIG. 5, each TOR has five tunnels, four tunnels to connect to the TORs of the other two racks and one tunnel to connect to the SFE 510.

The host 505 in some embodiments is a host that is not in racks 150, 152, and 154, which are serviced by TORs A-F. In other embodiments, the host 505 is in one of the racks 150, 152, and 154. FIG. 5 shows the physical controller 130d (1) collecting MAC records from SFE 510 to construct UMR tables, and (2) distributing the reconciled UMR table to the SFE 510 of the host 505. In this example, the physical controller 130d is the master physical controller of the SFE 510. The physical controller 130d passes the UMR table collected from the SFE 510 to the logical controller 135a, so that it can construct the master UMR table for the LFE X.

As the master physical controller 130d for the SFE 510, the physical controller 130d provides data that allows the SFE 510 to facilitate the creation of the LFE X. To create this LFE, either the SFE 510 gets physical control plane data from the physical controller 130d, or this controller 130d provides the configuration data to a local controller on the host 505, which generates physical control plane data that allows the SFE 510 to establish tunnels and/or process packets to facilitate the creation of LFE X. As part of the data that it pushes to the SFE 510, the physical controller 130d in some embodiments pushes the reconciled UMR table so that the SFE will know how to route data packets to machines behind the TORs. In other embodiments, the reconciled UMR tables are not pushed to the SFE 510 because this SFE performs MAC learning to identify the TORs to which it needs to route the packets.

As shown by the example illustrated in FIG. 5, the TOR assignment tables (i.e., the UMR tables in these examples) can be distributed to other tunnel endpoints. One of ordinary skill will realize that the collection, reconciliation and distribution process of some embodiments can be used more generally to collect, reconcile and distribute MAC tables for any arbitrary architecture that (1) has one or more MACs operate between logical network tunnel endpoints (e.g., hardware forwarding elements or software forwarding elements), and (2) has the MAC addresses behind different logical network tunnel endpoints distributed to the logical network tunnel endpoints. The MAC addresses are collected, reconciled and distributed so that the logical network tunnel endpoints will know how to route data packets that are intended for machines (or containers) behind other logical network tunnel endpoints.

In the examples illustrated in FIGS. 1-5, the TOR assignment tables (i.e., the UMR tables in these examples) identify master and slave TORs for MACs that operate behind each TOR. Other embodiments collect, reconcile and distribute MAC assignment tables that only identify a master logical network tunnel endpoint (e.g., a TOR or SFE) behind which one or more MACs operate. Such an approach is useful for cases where a compute end node (e.g., a VM or container) migrates from a first host in a first rack that has a first TOR to a second host in a second rack that has a second TOR.

Figure 6:
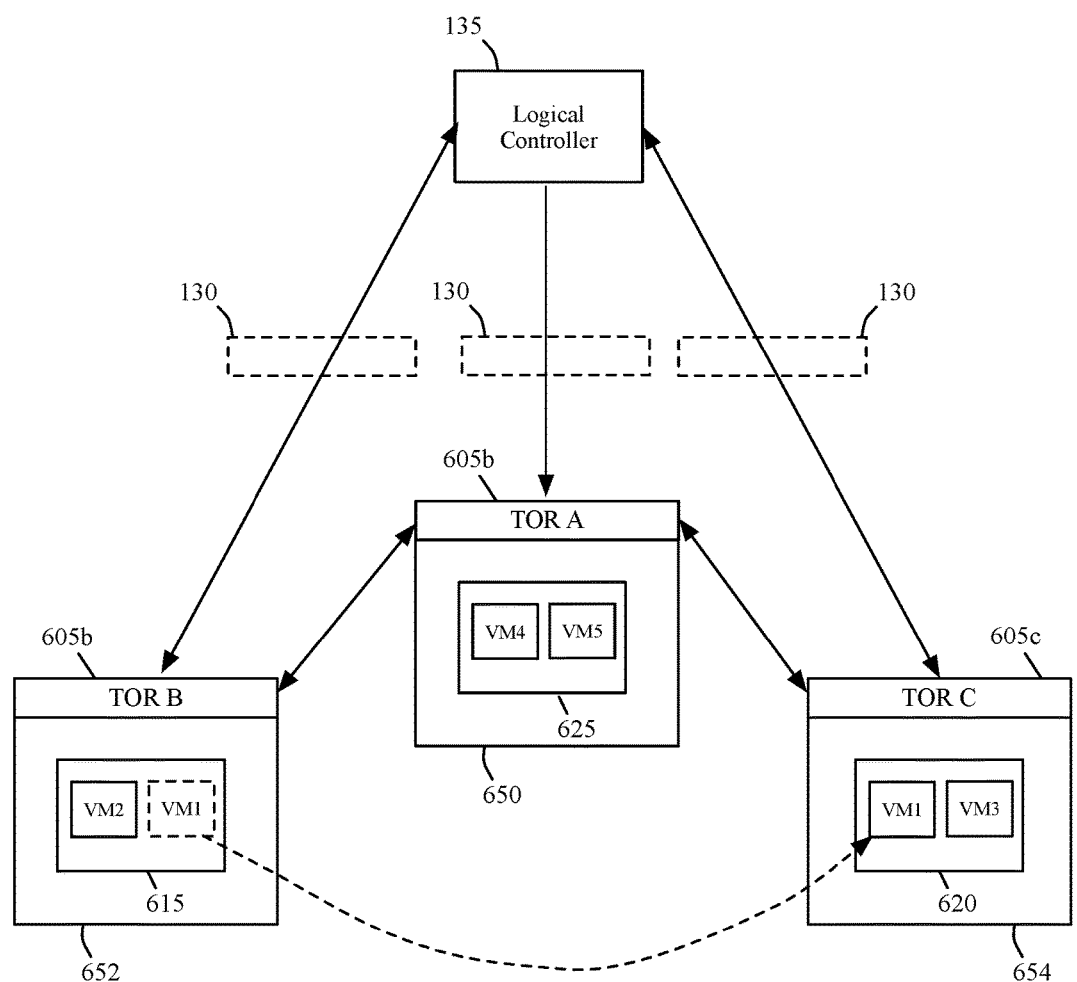
FIG. 6 illustrate an example of using some embodiments to reconcile tunnel endpoint assignments to ensure packet routing after a virtual machine from one tunnel endpoint's domain to another tunnel endpoint's domain.

FIG. 6 illustrates one such case. Specifically, it illustrates an example where a first VM (VM1) migrates from a first host 615 in a first rack 652 to a second host 620 in a second rack 654. In such a case, both the first and second TORs 605b and 605c might concurrently claim to be the master TOR for the migrated VM1, and this might cause the data packets from other compute end nodes (e.g., VM4 and VM5 on host 625 of rack 650) or other TORs (e.g., TOR 605a of rack 650) to route their data packets (that are intended for the migrated VM1) incorrectly to the wrong rack (i.e., to host 615 of rack 652).

Thus, these embodiments use the physical controllers 130 of the logical network tunnel (LNT) endpoints (i.e., TORs 605b and 605c in this example) to gather MAC assignment tables from their respective LNT endpoints and pass each logical network's MAC assignments to the network's logical controller 135. The logical controller 135 then analyzes the supplied MAC assignments to maintain a reconciled MAC assignment tables for each of its logical networks. The logical controller 135 distributes the reconciled MAC assignment records to the physical controllers 135 of all TORs that are responsible for VMs that are part of the logical network. In addition to TORs 605b and 605c, these TORs include TOR 605a of rack 650, which includes VM4 and VM5 that are part of the same logical network as VM1-VM3. The physical controllers 130 distribute the reconciled MAC assignment records to their respective TORs 605a-b. Once the TORs have the reconciled MAC assignment records, their correct their own records. This allows TOR 605a to route packets intended for VM1 correctly to TOR 605c and not incorrectly to TOR 605b.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
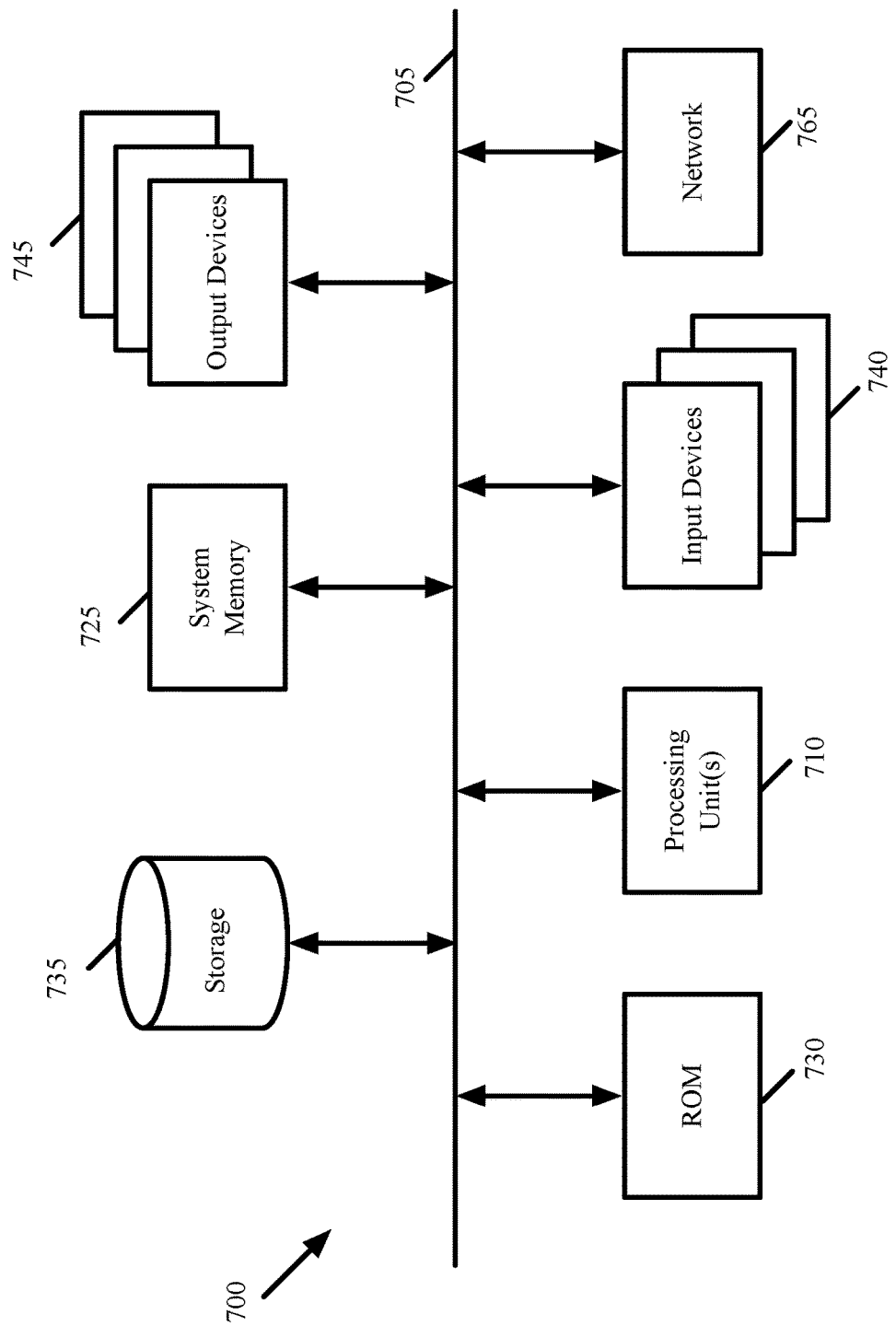
FIG. 7 illustrates a computer system that is used to implement some embodiments of the invention.

FIG. 7 conceptually illustrates a computer system 700 with which some embodiments of the invention are implemented. The computer system 700 can be used to implement any of the above-described hosts, controllers, and managers. As such, it can be used to execute any of the above described processes. This computer system includes various types of non-transitory machine readable media and interfaces for various other types of machine readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the computer system. The input devices 740 include alphanumeric keyboards and pointing devices (also called "cursor control devices"). The output devices 745 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of computer system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, this specification refers throughout to computational and network environments that include virtual machines (VMs). However, virtual machines are merely one example of data compute nodes (DCNs). DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc. One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program for managing a logical network that spans a plurality of managed physical forwarding elements, the program for execution by at least one hardware processing unit, the program comprising sets of instructions for:
    from a particular physical forwarding element (PFE), sending an initial PFE master inventory that identifies any compute end node of the logical network for which the particular PFE has a record that identifies the particular PFE as a master PFE for receiving messages for the compute end node; and
    at the particular PFE, receiving a processed PFE master inventory that changes a master PFE designation for at least one particular compute end node as another PFE was identified as the master PFE for the particular compute end node when the master inventories of the particular PFE and the other PFE were processed to determine that both PFEs identified themselves as the master PFE for the particular compute end node.

2. The non-transitory machine readable medium of claim 1,
    wherein the initial PFE master inventory is sent to, and the processed PFE master inventory is received from, a physical controller that manages the particular PFE,
    wherein the physical controller forwards the initial PFE master inventory to a logical controller that manages the logical network and receives PFE master inventories for other PFEs, generates processed PFE master inventories, and distributes the processed PFE master inventories to a set of one or more physical controllers.

3. The non-transitory machine readable medium of claim 2, wherein the physical controller is a master controller for the particular PFE for supplying data to configure the particular PFE.

4. The non-transitory machine readable medium of claim 2, wherein the physical controller is master controller for at least one other PFE.

5. The non-transitory machine readable medium of claim 2, wherein no two physical controllers concurrently communicate with the same PFE because only one physical controller is a master of any one PFE at any given time.

6. The non-transitory machine readable medium of claim 1,
    wherein the master inventories specify media access control (MAC) addresses of compute end nodes that operate behind each PFE;
    wherein a plurality of different pairs of PFEs connect to each other through tunnels; and
    wherein the tunnels establish overlay logical networks that are defined on the PFEs.

7. The non-transitory machine readable medium of claim 1, wherein at least a plurality of tunnels pass through intervening network fabric that is between the PFEs.

8. The non-transitory machine readable medium of claim 1, wherein the PFEs comprise at least one of top-of-rack (TOR) switches and software forwarding elements, and the compute end nodes comprise at least one of virtual machines and containers executing on hosts executing the software forwarding elements or connecting to the TOR switches.

9. The non-transitory machine readable medium of claim 1, wherein another PFE that did not send the PFE master inventor also receives the processed PFE master inventory.

10. A method of managing a logical network that spans a plurality of physical forwarding elements, the method comprising:
   from a plurality of the physical controllers that manage a set of logical network tunnel endpoints (LNTE) for a logical network, receiving LNTE master records that identify any compute end node of the logical network for which an LNTE in the LNTE set is designated as the master LNTE;
   processing the received records to identify and resolve any inconsistency in the received records to specify only one LNTE in the LNTE set as the master of each compute end node of the logical network; and
   supplying processed LNTE master records to the physical controllers for passing the records to the LNTE set.

11. The method of claim 10, wherein at least one physical controller communicates with two LNTEs.

12. The method of claim 10, wherein no two physical controllers concurrently communicate with the same LNTE because only one physical controller is a master of any one LNTE at any given time.

13. The method of claim 10,
   wherein the master records are media access control (MAC) addresses of compute end nodes that operate behind each LNTE;
   wherein a plurality of different pairs of LNTEs connect to each other through tunnels; and
   wherein the tunnels establish overlay logical networks.

14. The method of claim 13, wherein at least a plurality of tunnels pass through intervening network fabric that is between the LNTEs.

15. The method of claim 13, wherein the LNTEs comprise at least one of top-of-rack (TOR) switches and software forwarding elements, and the compute end nodes comprise at least one of virtual machines and containers executing on hosts executing the software forwarding elements or connecting to the TOR switches.

16. The method of claim 10, wherein the set of LNTEs that receives the processed LNTE master records include the LNTEs that provided the received LNTE master records.

17. A non-transitory machine readable medium storing a program for managing a logical network that spans a plurality of physical forwarding elements, the program comprising sets of instructions for:
   receiving, from a plurality of the physical controllers that manage a set of logical network tunnel endpoints (LNTEs), LNTE master records that identify any compute end node of the logical network for which an LNTE in the LNTE set is designated as the master LNTE;
   processing the received records to identify and resolve any inconsistency in the received records to specify only one LNTE in the LNTE set as the master of each compute end node of the logical network; and
   supplying processed LNTE master records to the physical controllers for passing the records to the LNTE set.

18. The non-transitory machine readable medium of claim 17,
   wherein the master records are media access control (MAC) addresses of compute end nodes that operate behind each LNTE;
   wherein a plurality of different pairs of LNTEs connect to each other through tunnels; and
   wherein the tunnels establish overlay logical networks.

19. The non-transitory machine readable medium of claim 18, wherein at least a plurality of tunnels pass through intervening network fabric that is between the LNTEs.

20. The non-transitory machine readable medium of claim 18, wherein the LNTEs comprise at least one of top-of-rack (TOR) switches and software forwarding elements, and the compute end nodes comprise at least one of virtual machines and containers executing on hosts executing the software forwarding elements or connecting to the TOR switches.

* * * * *